United States Patent [19]

Tsien et al.

[11] 4,124,478
[45] Nov. 7, 1978

[54] THIN SHEET APPARATUS AND A FLUID FLOW DEVICE

[76] Inventors: Hsue C. Tsien, 11 Browning Dr., Livingston, N.J. 07039; Joseph A. Shropshire, 901 St. Marks Ave., Westfield, N.J. 07090; Agustin F. Venero, 31 Stewart La., Berkeley Heights, N.J. 07922

[21] Appl. No.: 766,127

[22] Filed: Feb. 7, 1977

[51] Int. Cl.² ............................................... C25B 9/00
[52] U.S. Cl. .................................... 204/255; 204/279; 165/166; 210/321 A; 429/39
[58] Field of Search ............................... 429/39, 34, 38; 204/255, 269, 279, 301; 210/321 A, 331, 487; 165/166

[56] References Cited

U.S. PATENT DOCUMENTS

| 3,188,242 | 6/1965 | Kordesch et al. | 429/38 |
|---|---|---|---|
| 3,530,005 | 9/1970 | Leonard | 429/39 |
| 3,746,578 | 7/1973 | Warszawski | 429/39 |
| 3,814,631 | 6/1974 | Warszawski et al. | 429/39 |

*Primary Examiner*—Charles F. LeFevour
*Attorney, Agent, or Firm*—Kenneth P. Glynn

[57] ABSTRACT

A thin sheet apparatus is described as having a front and a back and having a central area and a frame area disposed around the central area. The central area is made of a fluid impermeable material having substantially planar surfaces. The frame area contains two sets of supply orifices and drainage orifices which are opposite one another. The frame area also contains a plurality of channels for each orifice which connects the orifice with the central area. The pluralities of channels for the first set of supply orifices and drainage orifices are located on the front of the frame area while the pluralities of channels for the second set of supply orifices and drainage orifices are located on the back. Also described is a fluid flow device which contains a number of stacked groups of elements in which each of the groups contains the above mentioned thin sheet apparatus as well as various plastic sheets having channels connecting the supply orifices and drainage orifices and having membrane separator means for the stacked elements. The fluid flow device is particularly useful as an electrochemical cell in a preferred embodiment in which the central area is made of conductive material and in which the stacked groups of elements contain current collectors at each end.

20 Claims, 7 Drawing Figures

THIN SHEET APPARATUS AND A FLUID FLOW DEVICE

BACKGROUND OF THE INVENTION

The present invention relates to improved thin sheet apparatus structures as well as fluid flow devices containing these thin sheet apparatus structures. Such structures and devices have broad application, for example in filters, dialyzers, and heat exchangers, and it is contemplated that they may be particularly useful as electrochemical cells, e.g. as used in batteries, fuel cells, electrolyzers and other such devices.

U.S. Pat. No. 3,814,631 describes various types of framed electrodes containing means for supplying or draining liquids along the edges of the electrodes and specifically describes thin sheet apparatus structures containing a series of supply and drainage orifices with microchannels connecting these orifices with a conductive central area. U.S. Pat. No. 3,530,003 describes various types of fuel cell arrangements which contain framed electrodes in which the frames contain various supply and drainage orifices with connecting channels. These prior art references more particularly show various types of electrode structures which contain insulative frame areas and conductive central areas. While these structures do contain various orifice and channeling systems for the conveyance of fluids, it should be noted that the central areas are made of porous, mesh, goffered or lattice type material, either expanded or embossed sheet material, or cast or otherwise three-dimensionally formed material. Also, while these prior art devices are designed for carrying two different fluids through the system at a given time, it should be noted that the orifices for the first and second fluids passing therethrough respectfully are adjacent to one another and the possibility of leakage and contamination is, therefore, somewhat significant. Thus, there has been a need in the art for a thin sheet apparatus which can be used in fluid flow devices, e.g. electrochemical cells, which will, first, reduce or eliminate the need for the formation of lattices, grooves, or goffering on the surface of the conductive central areas, and second, minimize the possibility of contamination by the first fluid into the second, and vice versa.

DETAILED DESCRIPTION OF THE PRESENT INVENTION

The present invention provides a thin sheet apparatus and a fluid flow device containing the thin sheet apparatus which both eliminates the need for forming any type of detailed three-dimensional surface on the central area and also minimizes the possibility of cross-contamination between the fluids passing therethrough.

More specifically, the present invention provides a thin sheet apparatus having a front and a back and having a central area and a frame area disposed around the central area. This central area is made of a fluid impermeable material and has substantially planar surfaces. In general, the central area may be of the same thickness as the frame area or it may be thinner and thus recessed, e.g. in both the front and the back with respect to the frame area disposed around it. The frame area itself may be of any useful configuration, such as circular, rectangular, hexagonal, or whatever configuration one may desire for the ultimate external shape of a heat exchanger, battery or other electrochemical cell pack or the like. However, in its most convenient configuration, the frame area is rectangular in shape and contains, therefore, four sides.

Regardless of the particular configuration chosen for the frame area, this frame area contains two sets of supply and drainage orifices, the first set being located on a first predetermined portion of the frame area and the second set being located on a different second predetermined portion of the frame area. The supply orifices and drainage orifices in each set are positioned in substantially opposite locations to one another. Therefore, if the frame area is in a circular configuration, it may be mentally divided into quadrants and the supply orifices and drainage orifices of a given set would be located in opposite quadrants. Of course, if the frame area is rectangular in design, then the supply and drainage orifices of a given set may desirably be opposite and parallel to one another, i.e. the first set of supply and drainage orifices might be located on the top and bottom sides of the frame area and the second set of supply and drainage orifices might be located on the left and right sides of the frame area.

The frame area also contains a plurality of channels leading from each of the supply orifices toward the central area. Thus, each supply orifice has a number of channels. These channels are adapted to supply fluid from the supply orifices to the surface of the central area. The plurality of channels leading from each of the first set of supply orifices are located on the front of the frame area while the plurality of channels leading from each of the second set of supply orifices are located on the back of the frame. Correspondingly, the frame area also contains a plurality of channels leading from the central area toward each of the drainage orifices. These channels are adapted to drain fluid from the surface of the central area to the drainage orifices. The plurality of channels leading from each of the first set of drainage orifices are located on the front of the frame area and the plurality of channels leading from each of the second set of drainage orifices are located on the back of the frame area.

In one preferred embodiment, the thin sheet apparatus frame area has a plurality of channels for each orifice whereby the channels diverge from one another in the direction away from the orifice. In one particular embodiment, these diverging channels are equidistant from adjacent channels which diverge from the same orifice, when measured along a plane parallel to the said of the central area from which the channels lead.

In another preferred embodiment, the plurality of channels which flow from a given orifice have cross-sectional areas varying relative to one another in proportion to their respective lengths so as to equalize a pressure drop through each of the channels upon passage of the fluid therethrough. Thus, when the channels diverge from the orifice it is clear that the channels having the longest path will have a large cross-sectional area so as to equalize the pressure drop through each channel.

The present invention also contemplates that the above described thin sheet apparatus may advantageously be used in electrochemical devices such as fuel cells, batteries, electrolyzers and the like, and therefore, in one preferred embodiment the central area is made of a conductive material and the frame area is made of an insulative material. For example, the central area may be made of conductive carbon plastic, i.e. a mixture of (a) plastic such as polyethylene and/or polypropylene, polyvinylchloride, or other plastic, and (b) carbon black or other particulate conductive material. The frame may, of course, be made of the same plastic as the central area but without the conductive material, or it may be made of a different plastic insulative material.

The present invention is also directed to a fluid flow device containing the above described thin sheet apparatus structures. In the fluid flow device of the present invention, a plurality of stacked groups is secured together by means of end sheets at opposite ends of the stack. Each group of elements contains the thin sheet apparatus described above, and two plastic sheet materials which are substantially the same size and configuration as the central area of the thin sheet apparatus, as well as a separator, e.g. ion semipermeable membrane. The plastic sheet materials each have channels formed on a surface thereof, e.g. by means of ribbed surface or other means, and are arranged so that these channels communicate with the channels in the frame area of the thin sheet apparatus. More specifically, one of the sheets is disposed against, or within a recess of, the front central area so that the channels face the central area surface and communicate with the channels on the frame area of the first set of supply and drainage orifices, and the second plastic sheet material is disposed against, or within a recess of, the back of the central area so that its channels are in communication with the channels on the frame area of the second set of supply and drainage orifices. The separator, e.g. membrane or diaphragm, may be made of any material which permits the type of exchange desired for the particular fluid flow device application, i.e. high thermal conductivity for heat transfer systems, high ionic conductivity for electrochemical cells, e.g. ion exchange membranes or microporous membranes. The separator is placed against the back of one of the plastic sheet materials mentioned above and may be secured by means of framed spacers, e.g. having the identical configuration and orifices as the frame area of the thin sheet apparatus, or may be made part of an integral sheet having such a frame area. When the above-mentioned plastic sheet materials are used in conjunction with a thin sheet apparatus having a central area which is not recessed at all or is not recessed sufficiently to have the entire thickness of the plastic sheet materials disposed therein, the frame area or framed spacer for the separator may also act as a spacer for the thin plastic sheet materials. Alternatively, of course, separate spacers could be used for the plastic sheet materials.

In one preferred embodiment, however, the plastic sheet materials are substantially the same size in configuration as the central area of the thin sheet apparatus and is at least partially disposed within a recess of the central area. Thus, when the groups of elements are stacked together, the only portions of each group which are in communication with one another at the frame area location are the frame area of the thin sheet apparatus and the frame area of the separator or the separator framed spacer. That is, when the groups of this embodiment are stacked together to form a fluid flow device, each group is joined by having the frame area of the thin sheet apparatus pressed against the separator frame area or framed spacer, alternating with one another without any other material therebetween.

In another embodiment, the separator is substantially the same size in configuration as the overall thin sheet apparatus and contains orifices which would directly align themselves with the orifices on the thin sheet apparatus, as mentioned, and is sandwiched between framed spacers. In this embodiment, when the groups of elements are stacked together, they are joined at the frame area by alternating separator framed spacer sandwiches and thin sheet apparatus frame areas.

As mentioned, the stacked groups of elements are placed between end sheets. These end sheets contain orifices so as to permit the flow of a first fluid through the first set of supply orifices and drainage orifices and communicating channels in the stacked groups and so as to permit the flow of a second fluid through the second set of supply orifices and drainage orifices and communicating channels in the stacked groups of elements. Additionally, the fluid flow device of the present invention contains some means for securing the stacked groups of elements and end sheets together. This means may be, for example, adhesive material, or it may be some other mechanical type of bonding such as bolts through holes in each of the frame areas and separator frame area or framed spacers, and end sheets whereby the rods or bolts are screwed together so as to compress or squeeze together the stacked groups of elements and end sheets.

In one preferred embodiment of the present invention, the fluid flow device is used for an electrochemical cell and contains, in addition to the end sheets, two or more current collector plates. These current collector plates may be placed directly between the end sheet and the stacked groups of elements, i.e. just inside the end sheets. Typically, these current collectors are simply metallic plates or other conductive material plates which have the overall configuration of the stacked groups of elements. These current collectors usually have one or more conductive projections for withdrawing the current from the cell and may contain insulative parts, e.g. hole areas, to prevent shorting. Thus, when the thin sheet apparatus contains a frame area made of insulative material and a central area made of conductive material, the construction according to the present invention may provide a fluid flow device assembly, the outside of which is exclusively formed by insulative material so that the entire assembly can be held directly together by bolts placed into holes drilled through or formed in the insulative material. The entire assembly can thus easily be tightened without requiring additional insulation of locking bolts. Therefore, the space consuming construction of placing locking bolts at the outside of the assembly may be entirely avoided. Of course, any other conventional means of joining the stacked groups of elements together may be employed, as will be obvious to one of ordinary skill in the art.

The thin sheet apparatus, the fluid flow device and the operation of these will now be described more specifically with reference to the accompanying drawings.

Figure 1:
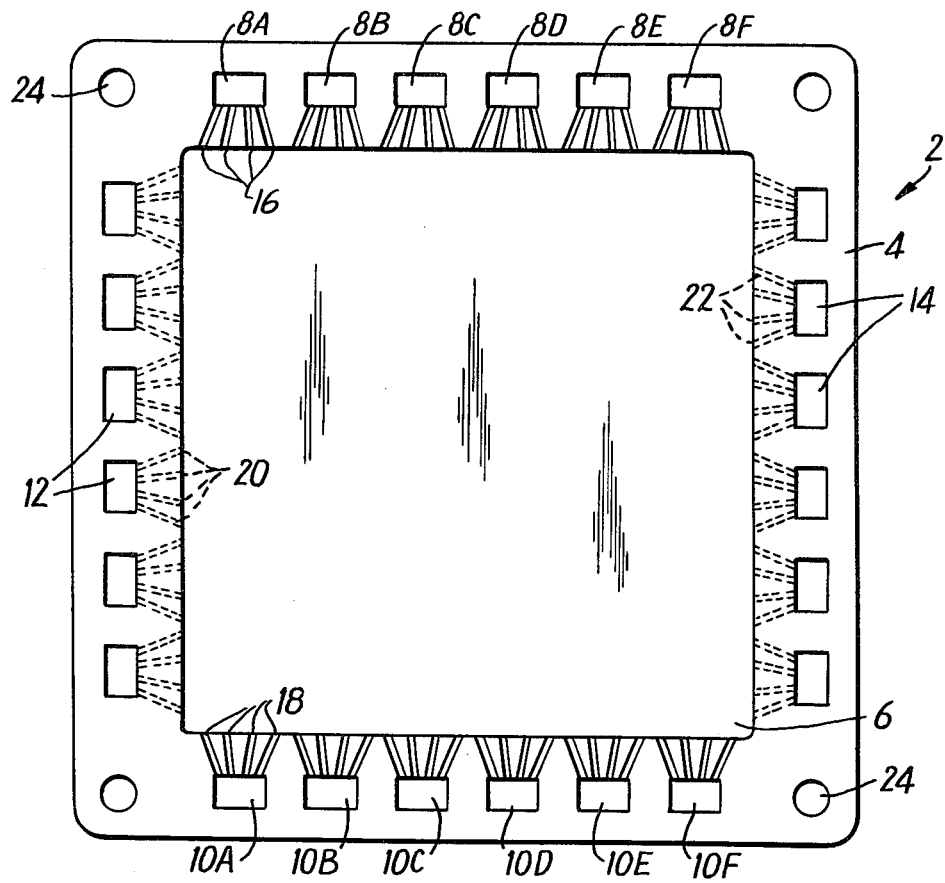
FIG. 1 shows a frontal view of one of the preferred thin sheet apparatus structures of the present invention.

Referring now to the drawings, and more particularly to FIG. 1, a thin sheet apparatus is shown which is generally designated as 2. The apparatus 2 contains a frame area 4 and a central area 6. Although not shown in the drawing, the frame area 4 may be made of insulative plastic, e.g. such as a polyethylene-polypropylene mixture, polyvinyl chloride or other plastic, and the central area 6 may be made up of similar plastic or different plastic, and may contain containing conductive carbon particles so as to create a conductive central area. The central area 6 is made so as to have substantially planar surfaces and is recessed, as more particularly shown below with respect to FIG. 3. Frame area 4 contains a first set of supply orifices 8A through 8F and oppositely positioned drainage orifices 10A through 10F which is located on a first predetermined portion of frame area 4. As illustrated, the predetermined portion of frame area 4 in this case is the top and bottom sides of the frame area. Additionally, frame area 4 also contains a second set of supply orifices represented by the orifices designated as 12, and oppositely positioned drainage orifices represented by the orifices designated as 14. This second set of supply orifices 12 and drainage orifices 14 is located on a different, second predetermined portion of frame area 4. In this particular apparatus, the second set of supply orifices 12 and drainage orifices 14 are located on the left and right sides of the frame area 4, respectively. Frame area 4 also contains a plurality of channels leading from each of the supply orifices toward the central area 6 and adapted to supply fluid from the supply orifices to the central area 6. Exemplary of these channels leading from each of the supply orifices are those designated as 16 for supply orifice 8A of the first set of orifices, and those designated as 20 for the orifices 12 representing the second set of orifices. It should be noted that the channels 16 which lead from supply orifice 8A to the central area 6 are located on the front of frame area 4 whereas the channels 20 leading from a supply orifice 12 to central area 6 are located on the back of frame area 4. Correspondingly, frame area 4 contains another plurality of channels leading from the central area 6 toward each of the drainage orifices in the first and second sets of orifices on frame area 4. These channels are adapted to drain fluid from the surface of central area 6 to the drainage orifices. Again, the plurality of orifices leading toward the first set of drainage orifices and represented by those designated as 18 are located on the front of frame area 4 whereas those leading toward the second set of drainage orifices are represented by those designated as 22 and are located on the back of frame area 4. The thin sheet apparatus 2 contains optional holes in each corner of frame area 4 represented by 24 for ultimately aligning and/or securing the thin sheet apparatus 2 to others in a stacked fashion, e.g. by means of bolts and nuts. Of course, any means which is conventional can be used to secure the thin sheet apparatus to others to ultimately form a fluid flow device of the present invention.

Figure 2:
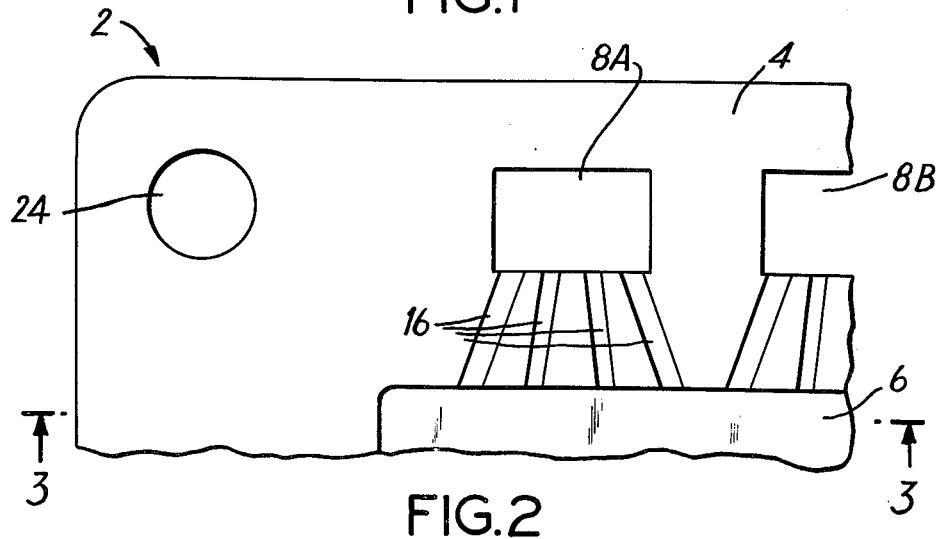
FIG. 2 shows a blown up section of one corner of the structure shown in FIG. 1.

FIG. 2 illustrates a blown up portion of the upper left hand corner of the thin sheet apparatus shown in FIG. 1 and, as with all of the drawings contained herein, identical parts are identically numbered. FIG. 2 shows that the channels flowing from supply orifice 8A to central area 6 and designated as 16 are shown to vary in their cross-sectional areas relative to one another in general proportion to their respective lengths so as to equalize the pressure drop through each of the channels upon passage of a fluid therethrough when used in a fluid flow device of the present invention. While this feature is not critical to the present invention, it is a preferred but optional aspect.

Figure 3:
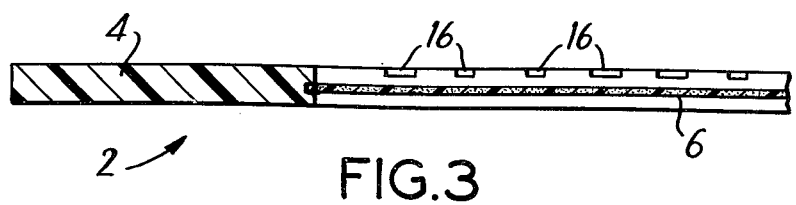
FIG. 3 shows a cut view of FIG. 2 along line 3'—3'.

FIG. 3 shows a side cut view of the illustration in FIG. 2 as taken along line 3'—3'. FIG. 3 shows the central area 6 as being relatively thin compared to frame area 4 and in fact recessed in both the front and back with respect to the frame area 4. Channels 16 are shown to have a depth which is less than the distance from the top edge of frame area 4 to the surface of central area 6. However, it should be noted that channels 16 may be of any depth which permits fluid to flow through the system. For example, channel 16 may be of a depth equal to the distance from the top edge of frame area 4 to the surface of central area 6.

Figure 4:
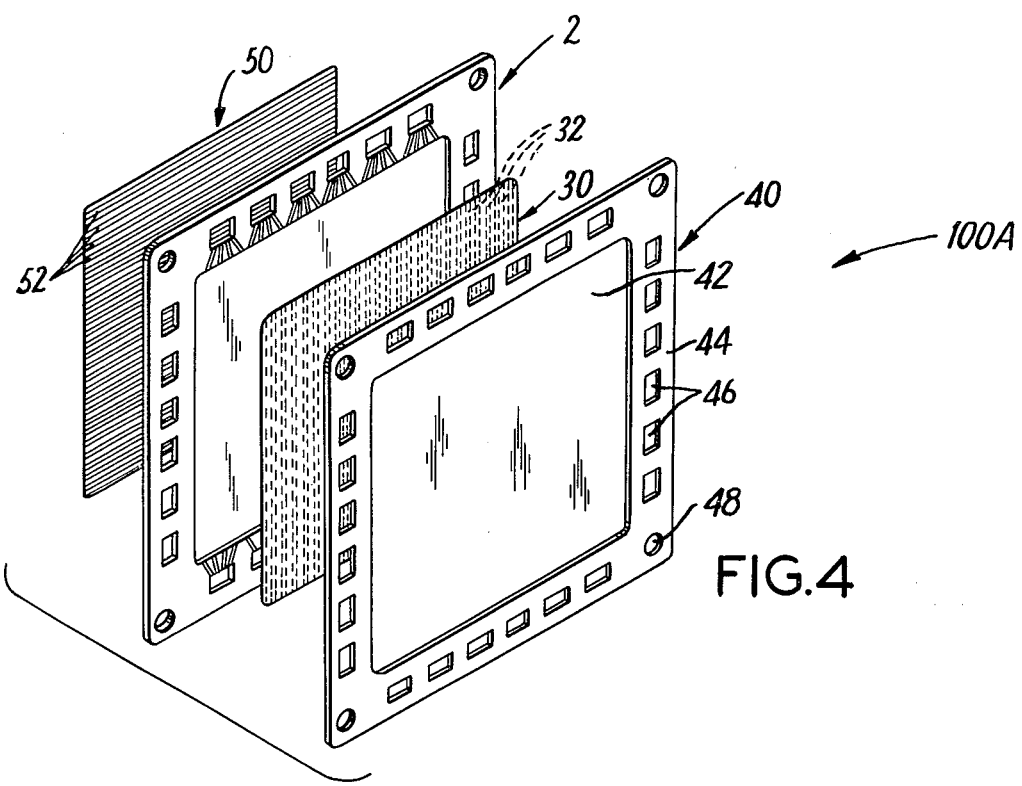
FIG. 4 shows an exploded perspective view of a single group of elements employed in the fluid flow device of the present invention.

FIG. 4 shows a stacked group of elements in blown perspective which is generally designated as 100A. The stack contains the thin sheet apparatus 2 and contains two plastic sheet materials designated as 30 and 50, respectively. Plastic sheet material 30 contains a series of channels designated as 32 which, when plastic sheet material 30 is disposed in the recessed central area of thin sheet material 2 faces the front of the central area and communicates with the channels of the first set of supply orifices and drainage orifices which are located on the frame area of the thin sheet apparatus. On top of this plastic sheet material 30 is placed a membrane separator designated as 40. The separator 40 in this embodiment is made up of membrane area 42, and frame area 44. This frame area 44 contains the same size and positioned orifices as those on thin sheet apparatus 2 as exemplified by orifices 46. Also, the alignment holes in the corners are similarly sized and placed with those on this sheet apparatus 2, as exemplified by hole 48. The channels 32 on plastic sheet material 30, as mentioned, face the central area of thin sheet apparatus 2, and membrane separator 40 is placed against the back of plastic sheet material 30. The second plastic sheet material 50 is placed against the back of the central area of thin sheet apparatus 2 and contains a series of channels designated generally as 52 which faces the back of the central area and communicates with the channels on the supply and drainage orifices which are located on the back of the frame area of thin sheet apparatus 2. Plastic sheet material 50 is disposed in the recess of the back central area, as mentioned, so that channels 52 face the central area.

Figure 5:
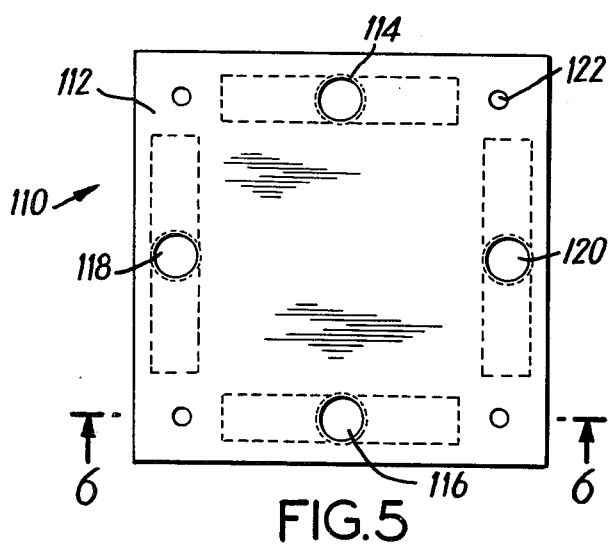
FIG. 5 shows a top view of one of the end sheets used in forming the fluid flow device of the present invention.

FIG. 5 shows a typical end plate or end sheet designated generally as 110 which may be used in combining stacked groups of elements such as are shown in FIG. 4. End sheet 110 is made of a material which is compatible with the thin sheet apparatus and other elements of the stacked groups and may be made of plastic or may comprise plastic and metal lamination or plastic and metal sheets. However, wherever metal is used, it should be noted that plastic fittings should be used to prevent contact between the fluids and the metal in those instances wherein the fluids are corrosive, e.g. certain types of electrolyte fluids. In FIG. 5, the end sheet 110 contains an inlet header port 114 and an outlet header port 116 which is more specifically shown in a cut view along line 6'—6' in FIG. 6. The inlet and outlet headers are adapted so as to permit the flow of a first fluid through the first set of supply orifices and drainage orifices and communicating channels. A second inlet header port 118 and outlet header port 120 correspondingly are adapted to permit the similar flow of a second fluid. End sheet 110 also contains optional holes 122 so as to permit assembly stacked groups of elements with the end sheet by means of bolts and nuts.

Figure 6:
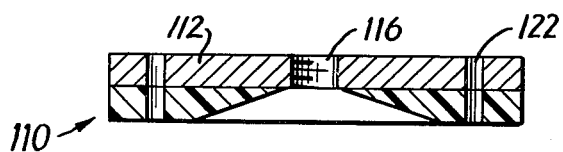
FIG. 6 shows a cut view of the end sheet in FIG. 5 along line 5'—5'.

FIG. 6, as mentioned, shows a cut view of end sheet 110 illustrated in FIG. 5. This particular end sheet is formed by two sheets of material, a plastic sheet 124 and a stainless steel sheet 126, the stainless steel sheet being optionally threaded to receive plastic fittings.

Figure 7:
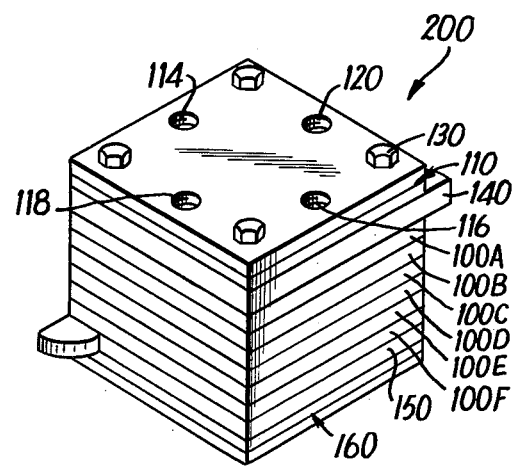
FIG. 7 shows a perspective view of an assembled fluid flow device.

FIG. 7 illustrates a completely assembled fluid flow device of the present invention. This fluid flow device generally designated as 200 contains end sheet 110, stacked groups of elements 100A through 100F and end sheet 160. In this particular embodiment, optional current collector sheets 140 and 150 are positioned at each end of the stacked groups of elements. End sheet 160, in this particular embodiment, contains no inlet or outlet ports and merely acts as an end surface for fluid return through the orifices and/or channels. The stacked groups of elements, the collector plates, and the end sheets are secured together through the holes in the corners of the stacked components by means of bolts 130 and nuts (not shown). For certain low viscosity fluids under pressure, additional securing means may be required, e.g. additional bolting and/or outside bolted metal framework. Also, as mentioned above, any other conventional means for securing the stacked components may be used. Likewise, any type of current collector and/or terminal arrangement which is well known in the art of thin sheet stacked cell devices may be used in those embodiments where the fluid flow device is to be used as a cell.

Various structural changes and modification as determined by the requirements of particular applications or uses may be made without departing from the inventor's concept. As is illustrated by the above drawings, significant advantages result from the thin sheet apparatus and fluid flow device of the present invention as compared to the prior art. For example, the orifices through which the first fluid and the second fluid flow are located in different portions of the frame area and therefore the likelihood of cross-contamination of fluids is substantially reduced. Additionally, as a result of the plastic sheet materials containing channels thereon, the necessity of having goffers or ridges or grids or other three-dimensional surface arrangements on the central area are no longer necessary. This permits a formation of thin sheet apparatus of the present invention by simply inserting flat planar central area material into the frame area. This may be done by any conventional technique such as vacuum molding, heat welding, chemical or mechanical adhesion, or other approach. And, the fluid flow device of the present invention may be incorporated in any type of other structure desired. Thus, where the fluid flow device is used as a heat exchanger rather than as an electrochemical cell, it might be useful to maintain the fluid flow device within heat loss prevention insulation. Also, the end plates may both have inlet ports and outlet ports or one may have only inlet ports and the other only outlet ports. Alternatively, the inlet and outlet ports may be on one end plate and the other end plate may have no holes at all and act only as a back wall in the stacked arrangement.

Although the embodiments discussed above are representative of embodiments of the present invention, they can be varied in many ways and yet be within the scope of the present invention. In addition to the above mentioned modifications, for example, the shape of the thin sheet apparatus may be any shape which is desirable or useful. Also, the particular shape of the central area may vary from the overall shape of the thin sheet device and, in fact, the central area on the front and back of a given thin sheet apparatus may be the same or different. Similarly, the profile of the various supply and drainage orifices may have different shapes, e.g. circular, oval, etc. and may be positioned differently. The framed area having the channels connecting various orifices with the central area could utilize systems of channels different in positioning and/or configuration and/or relation to each other than those disclosed herein. As mentioned, various changes and modifications may be made as determined by the specific structure and its size and shape selected by the designer without exceeding the scope of the present invention.

What is claimed is:

1. A thin sheet apparatus having a front and a back, comprising:

a central area and a frame area disposed around said central area;

said central area being made of a fluid impermeable material having substantially planar surfaces;

said frame area containing a first set of supply orifices and oppositely positioned drainage orifices, said first set being located on a first predetermined portion of said frame area, and a second set of supply orifices and oppositely positioned drainage orifices, said second set being located on a different, second predetermined portion of said frame area;

said frame area containing a plurality of channels leading from each of said supply orifices toward said central area and adapted to supply fluid from said supply orifices to the surface of said central area, the plurality of channels leading from each of the first set of supply orifices being located on the front of said frame area, and the plurality of channels leading from each of the second set of supply orifices being located on the back of said frame area;

said frame area containing a plurality of channels leading from said central area toward each of said drainage orifices and adapted to drain fluid from the surface of said central area to said drainage orifices, the plurality of channels leading from each of the first set of drainage orifices being located on the front of said frame area, and the plurality of channels leading from each of the second set of drainage orifices being located on the back of said frame area; and, said frame area having a total of four sides arranged in a rectangular fashion, wherein said first set of supply orifices and drainage orifices are located on two of said four sides and opposite one another, and said second set of supply orifices and drainage orifices are located on the remaining two of said four sides and opposite one another.

2. The apparatus of claim 1 wherein each of the plurality of channels leading from or toward each of said orifices forms a group in which the channels diverge from one another in the direction away from the orifices.

3. The apparatus of claim 2 wherein the channels in each group diverging from the orifices are equidistant from the adjacent channels in the same group when measured along a plane parallel to the side of said central area toward which or from which said channels lead.

4. The apparatus of claim 3 wherein the channels in each group have cross-sectional areas varying relative to one another in proportion to their respective lengths so as to equalize the pressure drop through each of the channels upon passage of fluid therethrough.

5. The apparatus of claim 4 wherein said central area is made of a conductive carbon plastic material.

6. The apparatus of claim 1 wherein said central area is recessed in both the front and the back with respect to said frame area.

7. The apparatus of claim 6 wherein the channels in each group diverging from the orifices are equidistant from the adjacent channels in the same group when measured along a plane parallel to the side of said central area toward which or from which said channels lead.

8. The apparatus of claim 7 wherein the channels in each group have cross-sectional areas varying relative to one another in propostion to their respective lengths so as to equalize the pressure drop through each of the channels upon passage of fluid therethrough.

9. The apparatus of claim 8 wherein said central area is made of a conductive carbon plastic material.

10. A fluid flow device, comprising:
(a) a plurality of stacked groups of elements, each of said groups of elements containing:
  (i) a thin sheet apparatus having a front and a back, comprising:
    a central area and a frame area disposed around said central area;
    said central area being made of a fluid impermeable material having substantially planar surfaces;
    said frame area containing a first set of supply orifices and oppositely positioned drainage orifices, said first set being located on a first predetermined portion of said frame area, and a second set of supply orifices and oppositely positioned drainage orifices, said second set being located on a different, second predetermined portion of said frame area;
    said frame area containing a plurality of channels leading from each of said supply orifices toward said central area and adapted to supply fluid from said supply orifices to the surface of said central area, the plurality of channels leading from each of the first set of supply orifices being located on the front of said frame area, and the plurality of channels leading from each of the second set of supply orifices being located on the back of said frame area;
    said frame area containing a plurality of channels leading from said central area toward each of said drainage orifices and adapted to drain fluid from the surface of said central area to said drainage orifices, the plurality of channels leading from each of the first set of drainage orifices being located on the front of said frame area, and the plurality of channels leading from each of the second set of drainage orifices being located on the back of said frame area; and,
    said frame area having a total of four sides arranged in a rectangular fashion, wherein the first set of supply orifices and drainage orifices are located on two of said four sides and opposite one another, and said second set of supply orifices and drainage orifices are located on the remaining two of said four sides and opposite one another;
  (ii) a first plastic sheet material substantially the same size and configuration as the central area of said thin sheet apparatus, disposed against the front of said central area, said first plastic sheet material having channels formed on the surface thereof which is against said central area and communicate with said pluralities of channels on the front of said frame area so as to permit fluid flow from said first set of supply orifices over said central area to said first set of drainage orifices;
  (iii) a separator, stacked against said first plastic sheet material; and
  (iv) a second plastic sheet material substantially the same size and configuration as the central area of said thin sheet apparatus, disposed against the back of said central area, said second plastic sheet material having channels formed on the surface thereof which is against said central area and communicate with said pluralities of channels on the back of said frame area so as to permit fluid flow from said second set of supply orifices over said central area to said second set of drainage orifices; and,
(b) end sheets at opposite ends of said stacked groups of elements, at least one of said end sheets having sets of orifices so as to permit the flow of a first fluid through said first set of supply orifices and drainage orifices and communicating channels and a second fluid through said second set of supply orifices and drainage orifices and communicating channels; and,
(c) means of securing said stacked groups of elements and end sheets.

11. The fluid flow device in claim 10 wherein said separator is supported by framing means selected from the group consisting of sandwiching framed spacers, and an integral frame area, said framing means having substantially the same configuration and orifices as said frame area of said thin sheet apparatus.

12. The fluid flow device of claim 11 wherein each of the plurality of channels on the frame area of said thin sheet apparatus leading from or toward each of said orifices forms a group in which the channels diverge from one another in the direction away from the orifices.

13. The fluid flow device of claim 12 wherein, on said frame area, the channels in each group diverging from the orifices are equidistant from the adjacent channels in the same group when measured along a plane parallel to the side of said central area toward which or from which said channels lead.

14. The fluid flow device of claim 13 wherein, on said frame area, the channels in each group have cross-sectional areas varying relative to one another in proportion to their respective lengths so as to equalize the pressure drop through each of the channels upon passage of fluid therethrough.

15. The fluid flow device of claim 14 wherein said central area is made of conductive carbon plastic material.

16. The fluid flow device of claim 10 wherein two current collectors are included, one between each end of said stacked groups of elements and end sheets, respectively.

17. The fluid flow device of claim 16 wherein each of the plurality of channels on the frame area of said thin sheet apparatus leading from or toward each of said orifices forms a group in which the channels diverge from one another in the direction away from the orifices.

18. The fluid flow device of claim 17 wherein, on said frame area, the channels in each group diverging from the orifices are equidistant from the adjacent channels in the same group when measured along a plane parallel to the side of said central area toward which or from which said channels lead.

19. The fluid flow device of claim 18 wherein, on said frame area, the channels in each group have cross-sectional areas varying relative to one another in proportion to their respective lengths so as to equalize the pressure drop through each of the channels upon passage of fluid therethrough.

20. The fluid flow device of claim 19 wherein said central area is made of conductive carbon plastic material.